United States Patent
Deck et al.

(10) Patent No.: US 11,842,452 B2
(45) Date of Patent: Dec. 12, 2023

(54) PORTABLE DISPLAY DEVICE WITH OVERLAID VIRTUAL INFORMATION

(71) Applicant: Hitachi Energy Switzerland AG, Zürich (CH)

(72) Inventors: Bernhard Deck, Weilheim (DE); Stephan Gerspach, Herrischried (DE); Michele Luvisotto, Västerås (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 17/552,541

(22) Filed: Dec. 16, 2021

(65) Prior Publication Data
US 2022/0189126 A1    Jun. 16, 2022

(30) Foreign Application Priority Data
Dec. 16, 2020  (EP) ..................................... 20214548

(51) Int. Cl.
*G06T 19/00*    (2011.01)
*G06T 7/70*    (2017.01)
(Continued)

(52) U.S. Cl.
CPC .......... *G06T 19/006* (2013.01); *G06T 7/0004* (2013.01); *G06T 7/70* (2017.01);
(Continued)

(58) Field of Classification Search
CPC ....... G06T 19/006; G06T 7/0004; G06T 7/70; G06V 10/70; H01Q 21/06; G01S 5/08; G06F 3/017; G06F 1/1626
See application file for complete search history.

(56) References Cited

U.S. PATENT DOCUMENTS

| 7,787,992 B2 | 8/2010 | Pretlove et al. |
| 2012/0105473 A1* | 5/2012 | Bar-Zeev .................. G06T 1/20 345/633 |

(Continued)

FOREIGN PATENT DOCUMENTS

| CA | 2980349 A1 * | 3/2018 | ............ H04W 4/021 |
| GB | 2506239 A * | 3/2014 | ........... G06F 3/1454 |

(Continued)

OTHER PUBLICATIONS

Extend European Search Report for the related European application No. 21121648 dated Jun. 11, 2021, 8 pages.
(Continued)

*Primary Examiner* — Ryan R Yang
(74) *Attorney, Agent, or Firm* — Procopio, Cory, Hargreaves & Savitch LLP (57) ABSTRACT

A method for positioning a virtual object in an image of a scene including a real object is disclosed. The method comprises receiving a signal from a short-range wireless transmitter arranged at a predetermined position relative to the real object and determining a location and orientation of the portable device relative to the short-range wireless transmitter based on the received signal. The image of the scene is displayed with the virtual object, wherein the position of the virtual object in the image is based on the determined location and orientation of the portable device relative to the short-range wireless transmitter and on the predetermined position of the short-range wireless transmitter relative to the real object. A system, a portable device and a computer program product is also disclosed.

16 Claims, 4 Drawing Sheets

(51) Int. Cl.
*G06V 10/70* (2022.01)
*G06T 7/00* (2017.01)
*H01Q 21/06* (2006.01)
*G01S 5/08* (2006.01)

(52) U.S. Cl.
CPC ............ *G06V 10/70* (2022.01); *H01Q 21/06* (2013.01); *G01S 5/08* (2013.01)

(56) References Cited

U.S. PATENT DOCUMENTS

| | | | | |
|---|---|---|---|---|
| 2013/0321390 | A1* | 12/2013 | Latta | G06T 19/006 |
| | | | | 704/E21.001 |
| 2013/0342572 | A1* | 12/2013 | Poulos | G02B 27/017 |
| | | | | 345/633 |
| 2014/0368532 | A1* | 12/2014 | Keane | G06F 3/04815 |
| | | | | 345/619 |
| 2014/0368534 | A1* | 12/2014 | Salter | G06F 3/012 |
| | | | | 345/619 |
| 2017/0262724 | A1* | 9/2017 | Wu | G06T 7/60 |
| 2018/0206096 | A1 | 7/2018 | Sharma et al. | |
| 2018/0365495 | A1 | 12/2018 | Laycock et al. | |
| 2019/0102488 | A1 | 4/2019 | Santarone et al. | |
| 2020/0184653 | A1* | 6/2020 | Faulkner | G06T 7/40 |
| 2020/0357204 | A1* | 11/2020 | Crequer | G06T 7/70 |
| 2021/0082197 | A1* | 3/2021 | Thiebaud | G06F 3/1423 |
| 2021/0133850 | A1* | 5/2021 | Ayush | G06V 10/774 |
| 2021/0375049 | A1* | 12/2021 | Syed | G06F 3/04815 |

FOREIGN PATENT DOCUMENTS

| | | |
|---|---|---|
| JP | 2020-80147 A | 5/2020 |
| WO | 2018/185717 A1 | 10/2018 |

OTHER PUBLICATIONS

Lehtimäki, "Bluetooth Angle Estimation for Real-Time Locationing", Silicon Labs, Date Unknown, 8 pages.

* cited by examiner

Fig. 7 ns
PORTABLE DISPLAY DEVICE WITH OVERLAID VIRTUAL INFORMATION

CROSS-REFERENCE TO RELATED APPLICATIONS

The present application claims priority to European App. No. 20214548.8, filed on Dec. 16, 2020, which is hereby incorporated herein by reference as if set forth in full.

TECHNICAL FIELD

The present disclosure generally relates to the field of inspection and service of equipment of an electrical transmission and/or distribution network, and more particularly to methods and devices for positioning a virtual object in an image of a scene including such equipment.

BACKGROUND

A technician or a field operator, for example at a substations of an electrical power transmission and/or distribution network, needs both to interact with systems or devices in the installed equipment and to have access to information about the installed equipment. The information may for example concern the identity of various components and parts of the installed equipment, guiding the technician or field operator to the right parts of the equipment. The information may also include characteristics or status of the various components and parts, for example including maintenance history and earlier repair reports.

Augmented reality is an example of a technique that has been employed in an attempt to assist the technician or field operator in accessing information about the installed equipment. Augmented reality is a method of overlaying real-world representations with computer-generated graphics, also referred to as virtual objects, comprising additional information about real objects in the image. Thus, with augmented reality the user gets a perception of the real-world environment which is improved by the presence of added virtual objects.

Augmented reality techniques are implemented today in for example handheld display devices, including tablets and smartphones, comprising a camera for capturing images of the environment which can be reproduced on a display or touch screen of the handheld display device together with additional information in form of computer-generated graphical features.

The above augmented reality techniques are however known to suffer from problems relating to poor accuracy of the positioning of the virtual objects with respect to the real objects in the real-world representations. These techniques are therefore too little or no help for technicians or field operators working in environments demanding high precision and positioning accuracy.

SUMMARY

It would be advantageous to achieve a technique overcoming, or at least alleviating, the above-mentioned drawbacks. In particular, it would be desirable to enable an improved positioning of a virtual object in an image of a scene including a real object.

To better address one or more of these concerns, a method, a system, a device and a computer program product having the features defined in the independent claims are provided. Preferable embodiments are defined in the dependent claims.

Hence, according to a first aspect, a method for positioning a virtual object in an image of a scene including a real object is provided, wherein the real object may form at least a part of a device of a transmission and/or distribution network. The method comprises acquiring the image of the scene by means of a portable device and receiving, at the portable device, a signal from a short-range wireless transmitter arranged at a predetermined position relative to the object. The method further comprises determining a location and orientation of the portable device relative to the short-range wireless transmitter based at least partially on the received signal. The method may further comprise displaying, on the portable device, the acquired image and the virtual object, and positioning, in the acquired image, the virtual object based at least partially on the determined location and orientation of the portable device relative to the short-range wireless transmitter and on the predetermined position of the short-range wireless transmitter relative to the real object.

According to a second aspect, a system for positioning a virtual object in an image of a scene including a real object is provided. The system may comprise a portable device for inspection and service of a device of a transmission and/or distribution network, a short-range wireless transmitter arranged at a predetermined position relative to the real object, and a processing unit. The portable device may be configured to acquire the image of the scene and receive a signal from the short-range wireless transmitter. The processing unit may be configured to, based at least partially on the received signal, determine a location and orientation of the portable device relative to the short-range wireless transmitter. Further, the portable device may be configured to, based at least partially on the determined location and orientation of the portable device relative to the short-range wireless transmitter, display the acquired image and the virtual object, and position the virtual object in the acquired image. The position of the virtual object in the acquired image may be based on the determined location and orientation of the portable device relative to the short-range wireless transmitter and on the predetermined position of the short-range wireless transmitter relative to the real object.

According to a third aspect, a portable device for inspection and service of a device of a transmission and/or distribution network is provided. The portable device comprises an imaging device configured to acquire an image of a scene including a real object, and a display device configured to display the acquired image. The portable device may be configured to receive a signal from a short-range wireless transmitter arranged at a predetermined position relative to the real object, and to be communicatively connected to a processing unit configured to, based at least partially on the received signal, determine a location and orientation of the portable device relative to the short-range wireless transmitter. The display device may be configured to display the acquired image with a virtual object, and to position the virtual object in the acquired image based at least partially on the determined location and orientation of the portable device relative to the short-range wireless transmitter and on the predetermined position of the short-range wireless transmitter relative to the real object.

According to a fourth aspect, a computer program product is provided, comprising instructions to cause a system according to the second aspect to execute the steps of the method according to the first aspect.

The present aspects utilise the signal from the short-range wireless transmitter to determine both location and orientation of the portable device relative to the short-range wireless transmitter. This allows for the virtual object to be more precisely positioned in the acquired image of the real object, especially in view of techniques that rely only on acceleration and gyroscopic data from an inertial measurement unit (IMU) of the portable device, and techniques relying only on received signal strength indicator (RSSI) data obtained from the signal. While techniques based on IMU data tend to suffer from accumulated errors, or drift errors leading to increasing offsets and poor repeatability, the present aspects provide a more reliable and accurate positioning based on the predetermined position of the transmitter relative to the real object. By using the signal from the transmitter, the location and orientation of the portable device can be calculated repeatedly (or even continuously) as the portable device is moved relative to the transmitter. Since the transmitter is arranged at a predetermined position in relation to the real object the position of the portable device can be established in relation to the known position of the transmitter also as the portable device is being moved. This may mitigate the problems with accumulated errors associated with positioning based on data from an IMU that is internal to a portable (and possibly moving) device. Further, while techniques relying on RSSI data may indicate a distance between the transmitter and a receiver of the portable device, such techniques are generally not particularly accurate when it comes to determining a direction from which the signal is transmitted. Thus, the present aspects are advantageous in that both distance and direction may be obtained from the signal of the transmitter. This allows for a more correct determination of the absolute location and, not at least, the orientation of the portable device relative to the transmitter (and thus the real object).

By orientation is generally understood the angular position, attitude or direction of the portable device, which together with its location describe how the portable device is placed in space. Thus, the orientation may be changed by rotating the portable device around its own axis, while the location may be changed by translating the portable device. In the context of the present disclosure, the location of the portable device may be described as the geospatial position in which it is situated, whereas the orientation may be described by the direction in which an optical axis of its imaging device is pointing.

Assuming that the position of the display device relative to the portable device is known, the determined location and orientation of the portable device (and hence the display device) relative to the real object can be used for determining the position of the real object in the image displayed on the display device. The position of the real object in the image can then be used to correctly position the virtual object in the image.

By short-range wireless transmitter, for brevity also referred to as "transmitter" in the following, is generally meant a radio-frequency transmitter device utilising a technology such as Bluetooth, Wi-Fi, near-field communication, ultra-wideband and IEE 802.15.4. A short-range transmitter may typically be a low-power transmitter limited to 25-100 mW effective radiated power, limiting its useful range to a few hundred metres. Preferably, the transmitter is capable of transmitting a signal from which a direction of propagation of the signal relative to a receiver of the portable device can be determined, as is described in further detail in the following.

By virtual object is generally meant a graphical object or feature that is displayed on the display device and is at least partly computer-generated. In other words, the virtual object may be considered a graphical feature comprising additional information that can be overlaid the image of the real world. Examples of virtual object may include tags, labels, text boxes, symbols, number, letters and the like.

Thus, according to an embodiment the virtual object may be a graphic feature associated with an identity of the real object. The virtual object may for example assist the user, such as a field operator or technician, in identifying various components or parts of the real object. Additionally, or alternatively the graphic feature may be associated with a characteristic of the real object. The characteristic may for example concern a status or function of a component or part of the real object, such as an applied voltage or a functional connection to other components or devices of an installed equipment, or to a maintenance history of the component. In further examples, the virtual object may comprise instructions guiding the user through a process at the equipment, such as an inspection or service process.

In a further example, the virtual object may be associated with a nature or category to which the real object belongs. While the identity of the real object may be unique for each real object, a plurality of individual real objects may be grouped according to a common characteristic according to their nature or category.

According to an embodiment, the identity and/or characteristic may be retrieved from the real object. Thus, the object, or a device associated with the object, may be configured to transmit data concerning the identify or characteristic to the portable device or a receiver associated with the portable device. In an example, the identity or characteristic may be transmitted by the short-range wireless transmitter, preferably via the same signal as used for determining the location and orientation of the portable device relative to the short-range wireless transmitter.

According to an embodiment, the identity and/or characteristics may be retrieved from a remote server, i.e., a server communicatively connected to the portable device and arranged at a separate physical location from the portable device. The server may be configured to house or access a database storing information associated with one or several devices or components of the equipment, and to provide the information to be displayed as virtual information in the acquired image.

The information from the server may be associated with an identity or category of the real object and provided to the portable device upon request for information associated with that identity. The identity may for example be obtained as input from the user, which may indicate a desired identity or category of which the user wishes to retrieve information from the server. In another example the identity or category may be obtained from the real object, for example via the signal as discussed above, and included in a request to the server. In a further example, the identity or category of the real object may be obtained by means of a computer-aided image analysis method.

Thus, according to an embodiment, the identity or category of the real object may be determined. The determination of the identity may involve processing of the acquired image, for example by means of a computer-aided analysis in which features or objects in the acquired image may be compared with features of known objects and features in previously captured images. This processing may also be referred to as an object recognition method. The identity or category of the real object may be determined automatically, i.e., without involving the user, or be presented as a suggestion to be confirmed by the user.

The identification of the real object in the image may also be used to further improve or verify the position of the real object in the image. Thus, the positioning of the virtual object in the acquired image may be further based on output of the object recognition method. The processing for determining the identity or category may therefore also allow for a more precise positioning of the virtual object in the acquired image.

According to an embodiment, the identity (or category) may be determined using an artificial intelligence (AI) algorithm that is trained on previously acquired images of real objects and the corresponding identity (or category) of these objects. Thus, the present embodiment employs an artificial intelligence algorithm (which also may be referred to as neural network technology, or machine learning) as a tool to improve the processing of the acquired image to obtain information about the real object. The artificial intelligence algorithm may be trained on previously captured images, in which real objects have been identified manually by a human, such as an operator of the portable device.

According to an embodiment the artificial intelligence algorithm may be updated by communicating with a server configured to receive images and information about the identity (or category) of real objects identified in the acquired images. This information may be used to further improve and train the artificial intelligence algorithm and to improve the accuracy of the identification of real objects.

The server may house the artificial intelligence algorithm. Additionally, or alternatively the artificial intelligence algorithm may be stored locally in the portable device. It will be appreciated that the artificial intelligence algorithm in some examples may be downloaded to the portable device from a remote location, such as for example the above-mentioned server or a remote server of an internet cloud infrastructure. Further, the artificial intelligence algorithm stored on the portable device may be replaced with newer versions, which in some examples may have been improved by input received from one or more portable devices. Thus, data generated by the usage of the portable device may be provided as input for training the artificial intelligence algorithm and eventually improve the method and the device.

Examples of artificial intelligence algorithms include probabilistic graphical models such as Bayesian networks, Random Forest, probabilistic classifiers and/or controllers (e.g. Gaussian mixture models). Further examples include neural networks, such as recurrent networks, and reinforcement leaning, gated recurrent units, long short-term memory architectures and attention nets.

According to an embodiment the location of the portable device relative to the short-range wireless transmitter may further be determined based on a signal strength of the short-range wireless transmitter. Measurements of the strength, or intensity, of the received signal may be combined with a propagation model to determine the distance between the short-range wireless transmitter and the receiver of the portable device. The determined difference may then be used together with directional information associated with the signal to determine the location and orientation of the portable device.

According to an embodiment, the location of the portable device relative to the short-range wireless transmitter may further be determined based on signals received from a plurality of short-range wireless transmitters. In an embodiment, the determination may involve triangulation of the signals. Thus, in case several short-range wireless transmitters are available, and arranged at a predetermined position relative to the real object, the determination of the location and orientation of the portable object may be further improved by including the signals from these transmitters in the calculations.

The determination of the orientation of the portable device in relation to the short-range wireless transmitter may involve determining the direction of propagation of the signal transmitted by the short-range wireless transmitter and incident on an antenna of the portable device. This may for example be achieved by determining a maximum signal strength during antenna rotation, or by measuring the time difference of arrival between individual elements of an antenna array of the portable device.

According to an embodiment, the portable device may comprise an array of antenna elements allowing for an angle of arrival (AoA) of the received signal to be determined. The AoA may be determined by measuring a difference in phase of the signal received at individual antenna elements in the array, wherein the determined AoA indicates the orientation of the portable device in relation to the short-range wireless transmitter. Preferably, the AoA determination may be combined with a distance determination based on the received signal strength for obtaining a measure of both orientation and location of the portable device relative to the short-range wireless transmitter.

The present embodiment is advantageous in that it allows for the orientation and location of the portable device to be determined using the signal from a single antenna, in this case of the transmitter. Several transmitters may indeed be used to verify the determined orientation and location, but unlike e.g. triangulation-based techniques that is not a requirement in the context of the present disclosure.

According to an embodiment, the short-range wireless transmitter may comprise an array of antenna elements allowing for an angle of departure (AoD) of the received signal to be determined. The AoD may be determined by measuring a phase difference in a similar way as described above for the AoD calculations. Thus, the receiving antenna of the portable device may take samples of the phase of the signal transmitted by the plurality of antenna elements in the array. Based on the phase sample data, the portable device can determine the relative signal direction and hence the relative orientation of the portable device and the transmitter. Preferably, these calculations are completed with a calculation of the distance based on received signal strength data of the signal so that both orientation and location of the portable device can be determined relative to the transmitter.

Similar to the embodiment related to the AoA calculations the present embodiment allows for the relative location and orientation of the portable device to be determined using a single antenna, in this case of the portable device. It may be possible to use more than one antenna, but it is not a requirement in the context of the present disclosure.

According to some embodiments, the portable device may comprise a positioning device, such as an internal positioning device, configured to provide data to the processing unit. The data may be used by the processing unit for determining the location and/or location of the portable device relative to the short-range wireless transmitter. The positioning device may for example comprise a short-range wireless receiver configured to collect data from the short-range wireless transmitter, or a global navigation satellite system, GNSS, receiver allowing the geospatial position of the portable device to be determined in a global coordinate system. Alternatively, or additionally the positioning device comprises an inertial measurement unit, IMU or an inertial sensor, for providing acceleration and gyroscopic data. The IMU data may be provided for further improving the accuracy when determining the orientation and location of the portable device relative to the short-range wireless transmitter.

According to an embodiment, the real object may be, or form part of an equipment device of a substation. Substations may act as connection points between different transmission lines of electrical systems, and might additionally transform voltage from high to low, or the reverse, or perform any of several other important functions in electrical transmission or distribution networks. The substations and the installed equipment of various substations are often designed differently. The present embodiments are advantageous in that they allow for one or several short-range wireless transmitters to be associated with components and devices of the substation for assisting the field operator or technician in identifying the correct components and devices, and to guide him or her to access, examine and carry out actions on the equipment. Examples of components or assets may include connectors and their applied cables, wherein the virtual objects may indicate signals transmitted through the cables, status of the cables leads, and data values associated with the cables. Further, the virtual objects may indicate an identification of cable types, and numbering and routing of the cables. The virtual objects may also identify several components or assets of the same type, such as e.g. a plurality of fans, and visualise a condition or status of each of the assets (such as e.g. indicating whether a fan is rotating or not).

According to some embodiments, the portable device may be a handheld display device, such as a tablet or a smartphone, or a head-mounted display device.

It will be appreciated that other embodiments than those described above are also possible. It will also be appreciated that any of the features in the embodiments described above for the method according to the first aspect may be combined with the system, device and product according to the other aspects, and vice versa.

Other objects, features and advantages of the enclosed embodiments will be apparent from the following detailed description, from the attached dependent claims as well as from the drawings. Those skilled in the art realize that different features of the present disclosure, even if recited in different claims, can be combined in embodiments other than those described in the following.

BRIEF DESCRIPTION OF DRAWINGS

Exemplifying embodiments will now be described in more detail with reference to the following appended drawings, on which.

As illustrated in the figures, the sizes of the elements and regions may be exaggerated for illustrative purposes and, thus, are provided to illustrate the general structures of the embodiments. Like reference numerals refer like elements throughout.

DETAILED DESCRIPTION

Exemplifying embodiments will now be described more fully hereinafter which reference to the accompanying drawing, in which currently preferred embodiments are shown. The disclosed subject matter may, however, be embodied in many different forms and should not be construed as limited to the embodiments set forth herein; rather, these embodiments are provided for thoroughness and completeness, and fully convey the scope of the subject matter to the skilled person.

Figure 1:
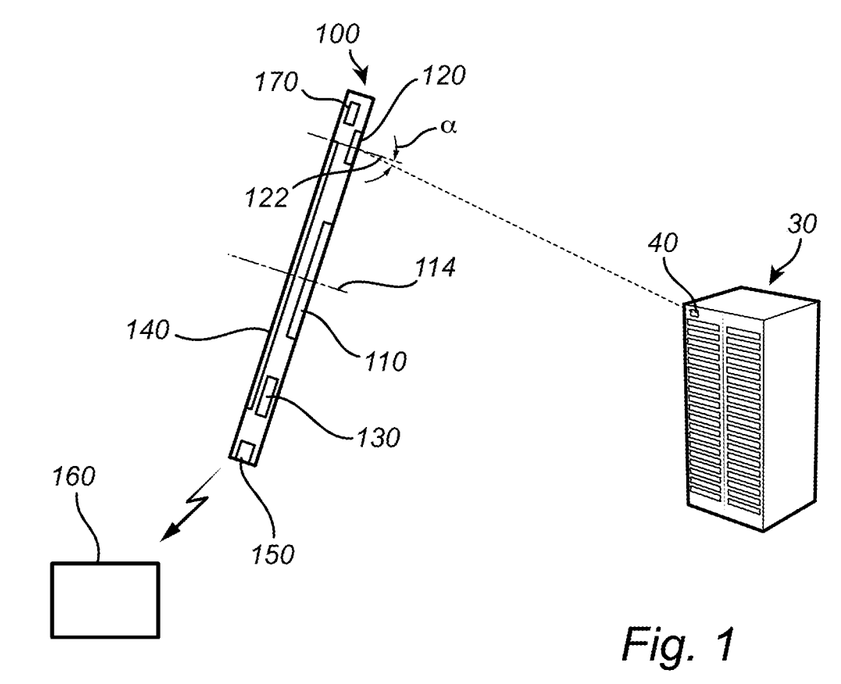
FIG. 1 shows a schematic view of a portable device for inspection and service of equipment of a transmission and/or distribution network in accordance with some embodiments.

With reference to FIG. 1, a portable device 100 according to some embodiments of the present disclosure is described. FIG. 1 shows a portable device 100, such as a handheld tablet, that may be used for inspection or service of equipment 30, such as primary equipment or secondary equipment, of a transmission or distribution network. The portable device 100 may comprise an imaging device 110, a positioning device or receiver 120, a processing unit 130, a display device 140, and a transceiver 150.

The display device 140 may be adapted to display one or more images captured by the imaging device 110 and a virtual object for assisting the user in accessing information about real object 30, as will be further explained with reference to FIG. 2. The display device 140 may further assist the user in capturing the images of the scene including the real object 30 within a field of view of the imaging device 110.

The virtual object may comprise information associated with the real object 30, which may be for example an equipment device or asset of a substation. In one example, the real object 30 may be a current transformer or a current sensor. The virtual object may indicate the identified transformer or sensor to the user, together with an output signal type and data value.

The portable device 100 may be provided with an antenna element for receiving a signal from a short-range wireless transmitter 40 arranged at a predetermined positioning relative to the real object 30. The antenna may in some examples form part of a positioning device or a receiver 120. Thus, the positioning device or receiver 120 may have one or several antenna elements (not shown) for receiving one or several signals from one or several short-range wireless transmitters 40. In case a plurality of signals is available, for example from the transmitter 40 associated with the real object 30 and from additional transmitters associated with the same object 30 or other objects, the plurality of signals may be subject to triangulation to further determine the location and/or orientation of the portable device relative to the real object 30.

In an example, the positioning device 120 may be configured to receive a radio frequency signal, such as a Bluetooth signal. Data obtained from the received signal may then be provided to the processing unit 130 for determining a position of the portable device 100 relative to the real object 30. Optionally, the positioning device may include or be configured to receive data from an inertial measurement unit, IMU 170 that may provide acceleration and gyroscopic data related to the movement and position of the portable device 100.

In the present embodiment, the processing unit 130 is arranged in the portable device 100. It is however appreciated that the processing unit 130 may as well be arranged externally to the portable device, such as in an internet cloud structure. The processing unit 130 may be in communication with the positioning device 120, the display unit 140 and, optionally, the IMU 170. In some examples, the processing unit 130 may further be configured to receive signals from a Global Navigation Satellite System, GNSS.

The processing unit 130 may be adapted to control the imaging device 110 to cause the capture of one or more images of a scene including the real object 30. The processing unit 130 may also be adapted to receive the images, or at least data corresponding to the images, captured by the imaging device 110, and further to control the images displayed by the display device 140.

As will be described in the following, the position of a virtual object in the image displayed by the display device 140 may be determined based on data collected by the positioning device 120.

The imaging device 110 of the portable device 100 may for example be a digital camera including an image sensor such as a semiconductor charge-coupled device (CCD), a complementary metal-oxide-semiconductor (CMOS) sensor or another active digital pixel sensor. The imaging device 110 is arranged at a certain position relative to the antenna of the positioning device 120.

The signal incident on the antenna of the positioning device 120 may be used to determine the distance between the antenna and the short-range wireless transmitter 40 sending the signal ("transmitter", for brevity). The distance may for example be calculated based on the intensity of the received signal combined with a path-loss model of the signal. The signal incident on the antenna of the positioning device 120 may further be used to determine a direction of the received signal, which may be defined by the angle of arrival or the angle of departure of the signal. The direction may for example be calculated based on phase measurements of the incident signal, as will be described further with reference to FIGS. 3a and b.

The antenna of the positioning device 120 may have a certain position and orientation relative to the portable device 100, so that the direction of the incident signal from the transmitter 40 can be defined in relation to the location and orientation of the portable device 100. In the present example, the direction of the incident signal is exemplified by the angle α between an axis 122 parallel to an optical axis 114 of the imaging device 110, and the sighting line between the antenna of the positioning device 120 and the transmitter 40.

Based on the direction of the incident signal and the distance to the transmitter 40, and since the position of the antenna of the positioning device 120 in the portable device 100 is known, the location and orientation of the portable device 100 can be estimated in relation to the transmitter 40. The location and orientation of the portable device 100 relative to the real object 30 may then be calculated based on the predetermined position of the transmitter 40 relative to the real object 30.

FIG. 1 also shows a remote device, such as a server 160 in communication with the portable device 100. The communication may for example be enabled by a transceiver 150 of the portable device 100. The server may be configured to receive images and information about the identity or category of a real object 30 in the image acquired by the imaging device 110. The server 160 may store information associated with the real object 30, such as for example identity, status or a characteristic of the object. In an example, the identity of the real object 30 may be provided to the server 160 which may respond by providing information associated with the identity of the real object 30 to the portable device 100. The information associated with the identity may then be displayed as a virtual object in the acquired image.

Further, the server may house an artificial intelligence algorithm that can be used for identifying the real object 30 in the image captured by the imaging device 110. The identification may be employed to further improve the positioning of the virtual object in the image, and to retrieve information associated with the identity of the real object 30. The artificial intelligence algorithm model may in some examples be downloaded from the server 160 and stored locally on the portable device 100, wherein in other examples the artificial intelligence algorithm may operate from the server 190.

Should the user find that the identification of the real object 30 is incorrect, the user may correct the information and the artificial intelligence algorithm be updated accordingly.

Although the server 160 is shown to be at a remote location, such as for example a remote server of an internet cloud infrastructure, the server 160 may be an integrated part of the portable device 100.

Figure 2:
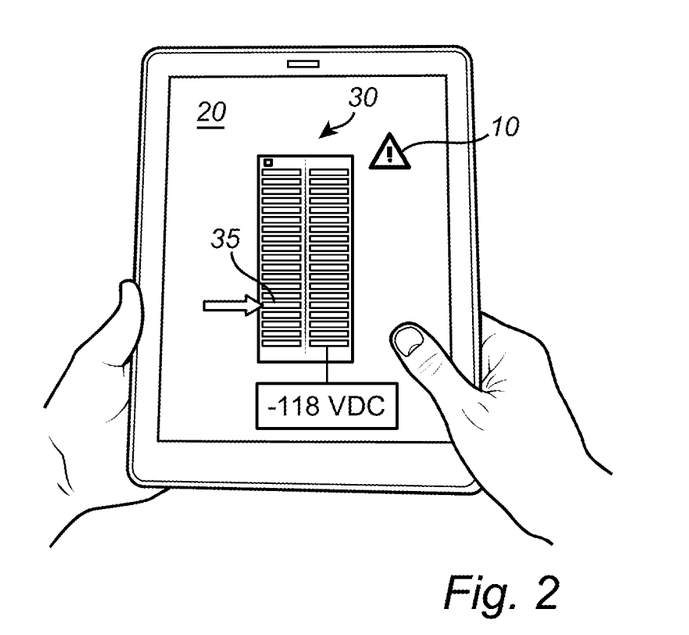
FIG. 2 shows an example of an acquired image displayed with virtual objects on a display device of a portable device in accordance with some embodiments.

FIG. 2 shows the display device 140 of the portable device 100 according the embodiments illustrated in FIG. 1. In the present example the image 20 of the scene including the real object in form of an equipment device 30 is displayed on the display device 140 together with information in the form of virtual objects 10, 12, 14. The virtual objects 10, 12, 14 may be computer-generated graphical features, such as symbols and text fields—in the present example illustrated by a warning symbol 10, an arrow 12 and an indicated voltage level 14. The virtual objects 10, 12, 14 are overlaid the image 20 and positioned in such manner that they convey information to the user about specific parts or components 35 of the shown equipment device 30. The position of the virtual objects 10, 12, 14 in the image is determined based on the location and orientation of the portable device 100 relative to the real object 30 and allows for the user to gain knowledge about for example identity, status and characteristics of specific part or components 35 of the imaged equipment 30.

In an embodiment, the portable device comprises an input means for receiving input from the user. The input means may for example be configured to allow the user to select a specific part or component, or virtual object, in the image to retrieve additional information associated with the selected item. The input means may for example comprise a touch screen 140 or a graphical navigation tool, such as user-controlled pointer. In an example, the input is sent as a request to the server 160, which may respond by providing stored information associated with the selected item. The stored information may be presented as virtual objects in the image on the display device 140.

Figure 3:
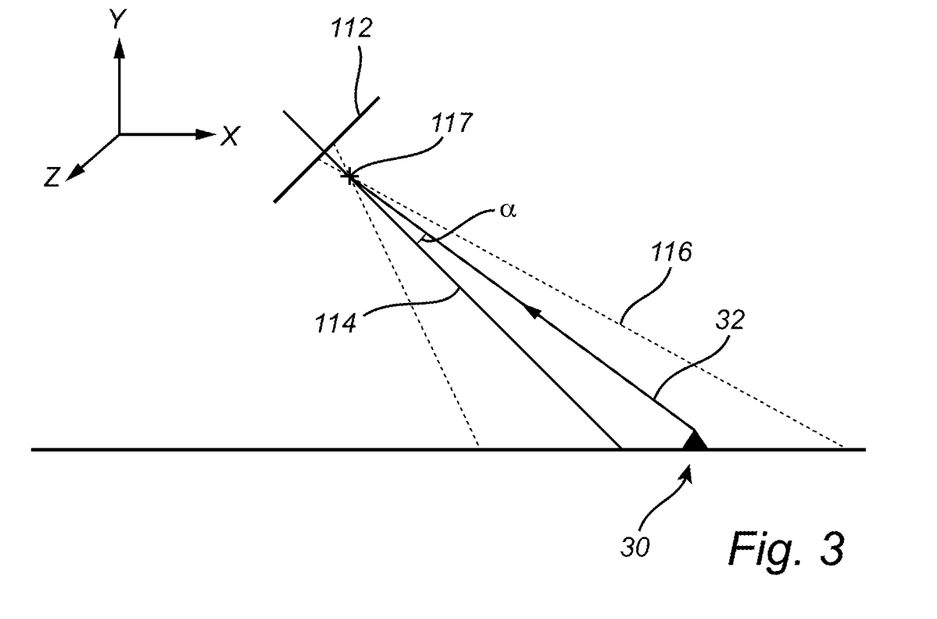
FIG. 3 shows the capturing of an image of a scene, including a real object, in accordance with some embodiments.

FIG. 3 shows a scenario in which the portable device 100 is placed at a position at which the real object 30 is viewed by the imaging device 110 while data from the signal from the short-range wireless transmitter 40 are collected together with data from the imaging device 110. The imaging device 110 may capture an image (or a sequence of images, or a video) of the scene or surface at which the real object 30 is located, as represented by the zone 116 of the field of view of the sensor 112 of the imaging device 110. The location at which the image is captured may correspond to the location of the projection centre 117 of the imaging device 110 (the lens being not shown in FIG. 3). It will be appreciated that another point of the portable device 110 may be taken as a reference such as for example the centre of the imaging sensor 112.

The portable device 100, or rather the processing unit 130 may determine the location of the projection centre 117 relative to the real object 30 in terms of a coordinate system X, Y, Z based on the signal from the transmitter 40 and the predetermined position of the transmitter 40 relative to the real object 30 as discussed above in connection with the previous figures. Accordingly, the processing unit 130 may further determine the relative orientation of the portable device 100 based on the same signal. The orientation may for example be defined by the angle $\alpha$ between an optical axis 114 of the imaging device 110 and an incident light ray 32 propagating from the real object 30.

An example of the transmission and receipt of a signal from a short-range wireless transmitter according to some embodiments will now be discussed with reference to FIGS. 4a and b.

Figure 4A:
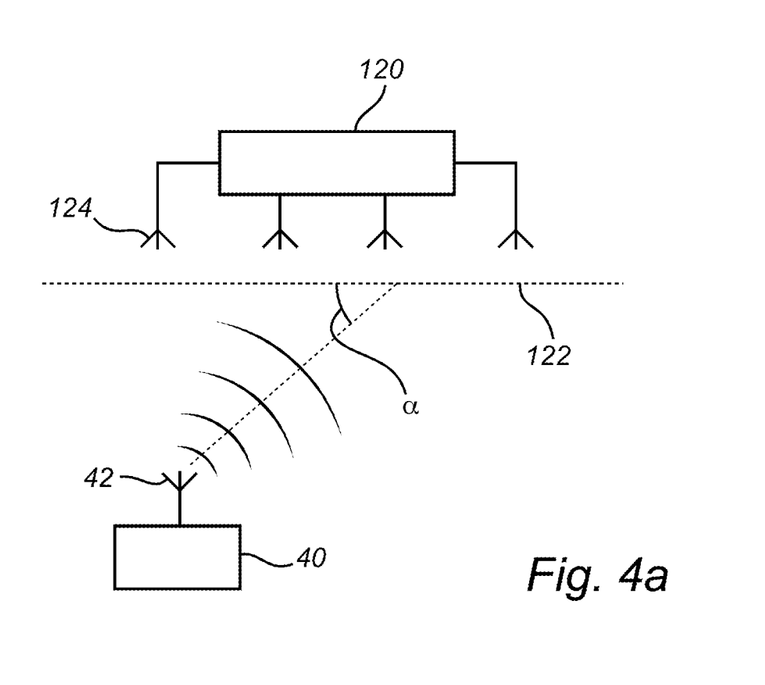
FIGS. 4a and b show examples of a transmitter and a receiver for determining location and orientation of the portable device relative to the real object in accordance with some embodiments.
Figure 4B:
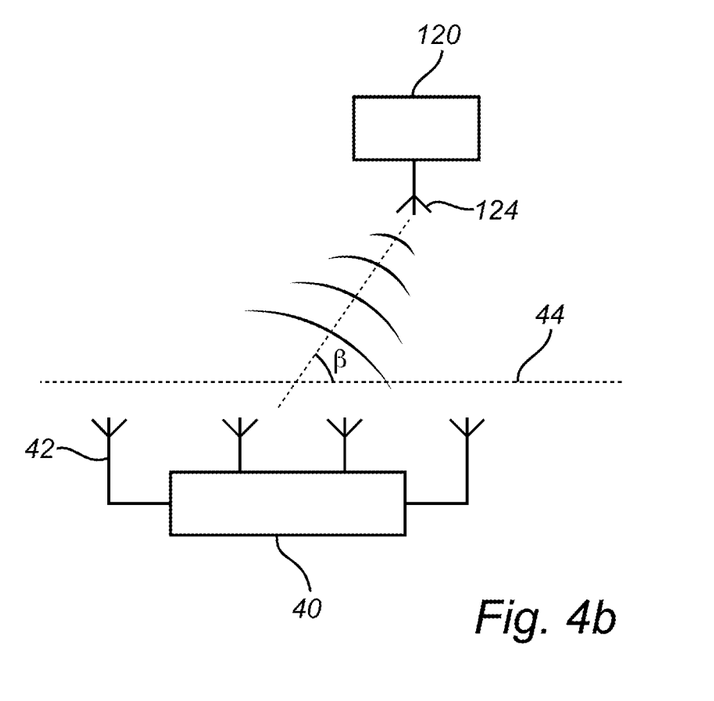

FIGS. 4a and 4b show a short-range wireless transmitter 40 and a receiver or positioning device 120, wherein the positioning device 120 is configured to receive a signal transmitted by the short-range wireless transmitter 40 in accordance to an embodiment. The short-range wireless transmitter 40 and the positioning device may for example be configured to support the Bluetooth 5.1 direction finding functionality. As discussed above in connection with the previous embodiments, the transmitter 40 may be arranged at a predetermined position relative to the real object 30, whereas the positioning device 120 may form part, or be communicating with, a portable device 100 for inspection and service of equipment comprising the real object 30.

FIG. 4a shows a transmitter 40 comprising a single antenna 42 for transmitting a radiofrequency signal, and a positioning device or receiver 120 comprising an array of antenna elements 124 for determining an angle of arrival (AoA) a of the signal. By using multiple antenna elements 124, a phase difference of the incident signal may be observed and used to determine the AoA and thus the orientation of the portable device 100 relative to the real object 30. In the present example, the angle of arrival a is indicated as the angle $\alpha$ between a plane (indicated by the line 122 in FIG. 4a) defined by the array of antenna elements 124 and the line of sight between the array of antenna elements 124 and the antenna 42 of the transmitter 40.

An alternative configuration is shown in FIG. 4b, wherein the transmitter 40 comprises an array of antenna elements 42 and the positioning device, or receiver 120 comprises a single antenna 124. Similar to the configuration in FIG. 4a a direction of the transmitted signal may be determined by observing the phase. In FIG. 4b the direction may be defined as the angle of departure (AoD) $\beta$ and may be described by the angle $\beta$ between a plane (indicated by the line 44 in the present figure) defined by the array of antenna elements 42 of the transmitter 40 and the line of sight between the array of antenna elements 42 and the antenna 124 of the positioning device 120.

Figure 5:
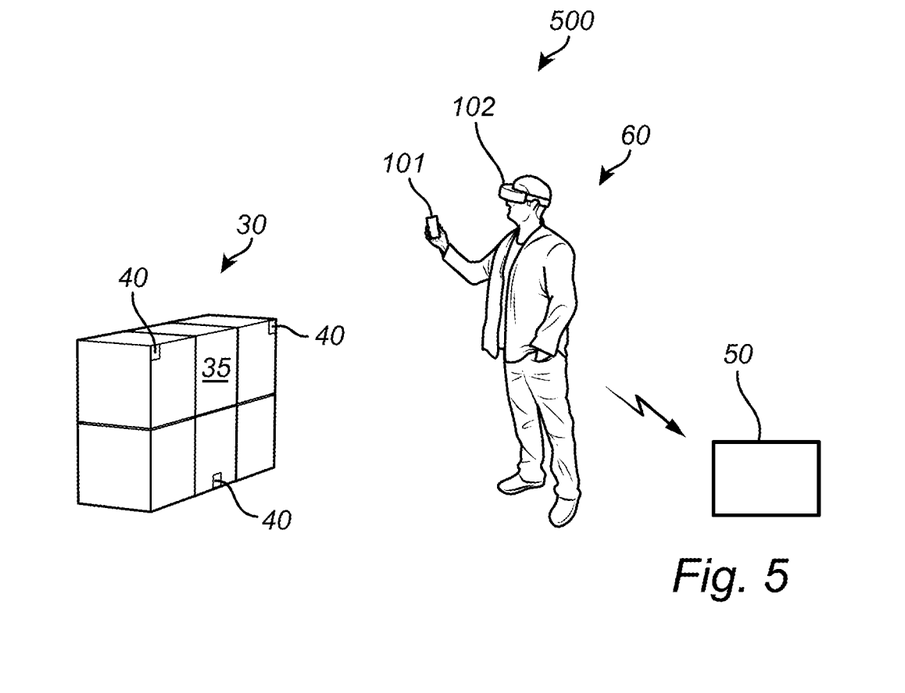
FIG. 5 show a schematic view of a system according to some embodiments.

FIG. 5 is a schematic illustration of a system 500 according to some embodiments. The system 500 may comprise a portable device 100, a plurality of short-range wireless transmitters 40 associated with a real object 30, a processing unit 130 and a server 50, which may be similarly configured as the embodiments described with reference to the previous figures.

The portable device 100 may be a handheld device 101 such as a tablet or smartphone, or a head-mounted device 102 such as an augmented reality headset. Both examples are indicated in the present figure, illustrating a user 60 holding the portable device in their hand or wearing it as a headset.

The user 60 may for example be a field operator or service technician accessing and/or carrying out actions on an installed equipment, such as a device 30 of a substation. In order to assist the user 60 in accessing information about components of the equipment, one or several transmitters 40 may be provided at the equipment to facilitate displaying of information in images captured by the portable device 100. Thus, while the user 60 directs the portable device towards the equipment 30 such that the object of interest (i.e., the equipment 30 or parts of the equipment) is viewed by the imaging device 110 of the portable device 100, signals from the transmitters 40 are received by the positioning device and data provided to the processing unit 130 for determining the orientation and location of the portable device 100 relative to the equipment 30. Further, components or devices of the equipment may be identified, and information associated with the components or devices be requested from a remote server 50. The information may then be presented to the user as virtual objects in the captured image displayed on the portable device 100.

Figure 6:
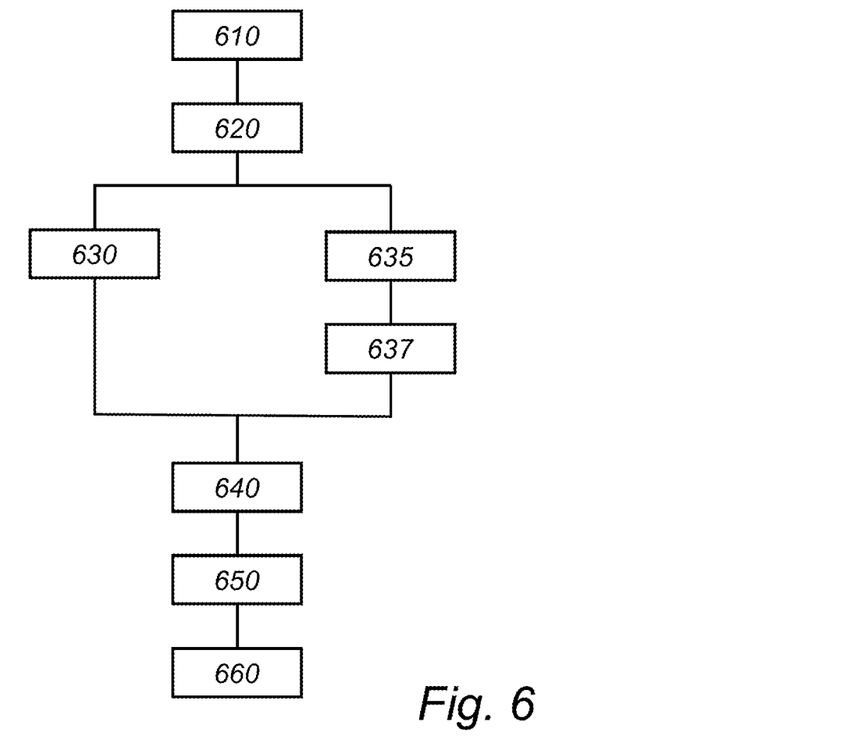
FIG. 6 is a flow chart illustrating methods of the present disclosure.

FIG. 6 is a flowchart illustrating a method for positioning a virtual object in an image in accordance with an embodiment, which may be similar to the embodiments described with reference to the previous figures. The method may comprise acquiring 610 the image 20 of the scene by means of a portable device 100, wherein the scene includes a real object 30, and receiving 620 at the portable device 100 a signal from a short-range wireless transmitter 40 arranged at a predetermined position relative to the real object 30. In some embodiments, the method may optionally comprise a step of retrieving 630 an identify or characteristic of the real object 30 from the object itself, preferably via the received signal. Alternatively, or additionally the identity may be determined by processing 635 the acquired image 20, preferably using an artificial intelligence algorithm, which may be updated 637 or trained on images and information about the identity of objects identified in the image.

Further, the method may comprise determining 640, based on the received signal, a location and orientation of the portable device 100 relative to the short-range wireless transmitter 40, displaying 650 on the portable device 100 the acquired image 20 and the virtual object 10, and positioning 660 in the acquired image 20 the virtual object 10 based on the determined location and orientation of the portable device relative to the short-range wireless transmitter 40 and on the predetermined position of the short-range wireless transmitter relative to the real object 30.

Figure 7:
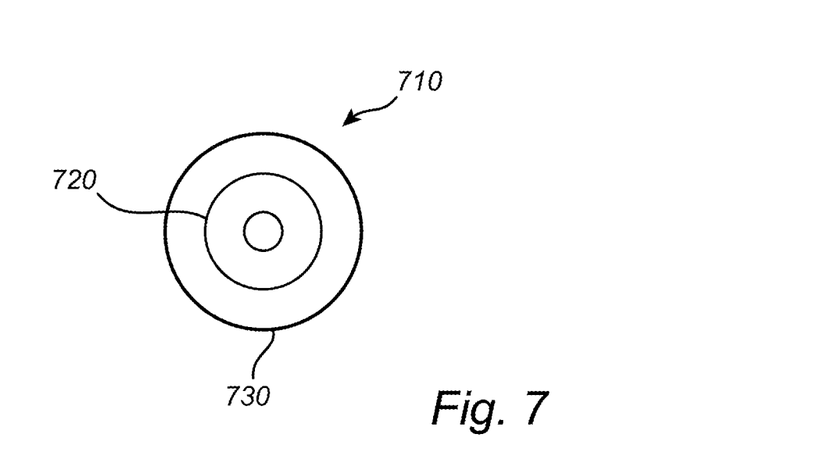
FIG. 7 shows an example of a computer program product comprising a computer readable storage medium in accordance with an embodiment.

FIG. 7 shows an example of a computer program product 710 comprising a computer readable storage medium 730. On this computer readable storage medium 730 a computer program 720 can be stored, which can cause the system 500 or the portable device 100 and thereto operatively coupled entities and device, such as the server 50, to execute methods according to embodiments described herein. The computer program 720 and/or computer program product 510 may thus provide means for performing actions as herein disclosed.

In the example of FIG. 7, the computer program product 710 is illustrated as an optical disc, such as a compact disc (CD) or a digital versatile disc (DVD) or a Blu-Ray disc. The computer program product could also be embodied as a memory, such as a random-access memory (RAM), a read-only memory (ROM), an erasable programmable read-only memory EPROM), or an electrically erasable programmable read-only memory (EEPROM) and more particularly as a non-volatile storage medium of a device in an external memory such as a Universal Serial Bus (USB) memory or a Flash memory, such as a compact Flash memory. Thus, while the computer program 720 is here schematically shown as a track on the depicted optical disc, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method for positioning a virtual object in an image of a scene including a real object, the real object forming at least a part of a device of a transmission and/or distribution network, comprising:
    acquiring the image of the scene by means of a portable device;
    receiving, at the portable device, a signal from a short-range wireless transmitter arranged at a predetermined position relative to the real object;
    determining, based at least partially on directional information associated with the received signal, a location and orientation of the portable device relative to the short-range wireless transmitter;
    retrieving an identity and/or characteristic of the real object from the received signal;
    displaying, on the portable device, the acquired image and the virtual object; and
    positioning, in the acquired image, the virtual object based at least partially on the determined location and orientation of the portable device relative to the short-range wireless transmitter and on the predetermined position of the short-range wireless transmitter relative to the real object, wherein the virtual object is a graphic feature associated with the identity and/or characteristic of the real object retrieved from the received signal.

2. The method according to claim 1, further comprising determining the identity of the real object by means of an object recognition method.

3. The method according to claim 2, wherein the object recognition method involves an artificial intelligence algorithm trained on previously acquired images of real objects and the corresponding identity of these objects.

4. The method according to claim 3, further comprising updating said artificial intelligence algorithm by communicating with a server configured to receive images and information about the identity of objects identified in the received images.

5. The method according to claim 4, further comprising receiving a correction to the positioning of the virtual object from a user of the portable device, wherein the communication with the server comprises the correction, and wherein the artificial intelligence algorithm is updated based on the correction.

6. The method according to claim 2, wherein the positioning of the virtual object in the acquired image is further based on output of the object recognition method.

7. The method according to claim 1, wherein:
    by using an array of antenna elements of the portable device an angle of arrival (AoA), of the received signal is determined, and/or
    by using an array of antenna elements of the short-range wireless transmitter an angle of departure (AoD), of the received signal is determined; and
    the location and orientation of the portable device relative to the short-range wireless transmitter further based on the AoA and/or the AoD is determined by the processing unit.

8. The method according to claim 1, wherein the location of the portable device relative to the short-range wireless transmitter is further determined based on a signal strength of said short-range wireless transmitter.

9. The method according to claim 1, wherein the location of the portable device relative to the short-range wireless transmitter is further determined based on triangulation.

10. The method according to claim 1, wherein the virtual object comprises one or both of a symbol or text field representing the identity and/or characteristic of a specific component of the real object, and wherein the method further comprises, in response to a user selecting the specific component or the virtual object:
    retrieving additional information from a remote server; and
    displaying the additional information on the portable device.

11. A system for positioning a virtual object in an image of a scene including a real object, comprising:
    a portable device for inspection and service of a device of a transmission and/or distribution network;
    a short-range wireless transmitter arranged at a predetermined position relative to the real object; and
    a processing unit;
    wherein the portable device is configured to:
    acquire the image of the scene, and
    receive a signal from the short-range wireless transmitter;
    wherein the processing unit is configured to, based at least partially on directional information associated with the received signal, determine a location and orientation of the portable device relative to the short-range wireless transmitter;
    wherein the processing unit is further configured to retrieve an identity and/or characteristic of the real object from the received signal; and
    wherein the portable device is further configured to:
    display the acquired image and the virtual object, and
    position the virtual object in the acquired image based at least partially on the determined location and orientation of the portable device relative to the short-range wireless transmitter and on the predetermined position of the short-range wireless transmitter relative to the real object, wherein the virtual object is a graphic feature associated with the identity and/or characteristic of the real object retrieved from the received signal.

12. The system according to claim 11, wherein:
    the portable device comprises an array of antenna elements allowing for an angle of arrival (AoA) of the received signal to be determined, and/or the short-range wireless transmitter comprises an array of antenna elements allowing for an angle of departure (AoD) of the received signal to be determined; and the processing unit is configured to determine the location and orientation of the portable device relative to the short-range wireless transmitter further based on the AoA and/or the AoD.

13. The system according to claim 11, wherein the portable device comprises a positioning device, and wherein the processing unit is further configured to determine the location and/or orientation of the portable device relative to the short-range wireless transmitter further based on data from the positioning device, wherein the positioning device comprises a global navigation satellite system (GNSS) receiver and/or an inertial sensor.

14. A portable device for inspection and service of a device of a transmission and/or distribution network, comprising:

an imaging device configured to acquire an image of a scene including a real object; and a display device configured to display the acquired image; wherein:

the portable device is configured to receive a signal from a short-range wireless transmitter arranged at a predetermined position relative to the real object;

the portable device is communicatively connected to a processing unit configured to, based at least partially on the received signal, determine a location and orientation of the portable device relative to the short-range wireless transmitter, the processing unit further configured to retrieve an identity and/or characteristic of the real object from the received signal; and the display device is further configured to display a virtual object in the acquired image, wherein a position of the virtual object in the acquired image is based at least partially on the determined location and orientation of the portable device relative to the short-range wireless transmitter and on the predetermined position of the short-range wireless transmitter relative to the real object, wherein the virtual object is a graphic feature associated with the identity and/or characteristic of the real object retrieved from the received signal.

15. The portable device according to claim 14, being a handheld display device or a head-mounted display device.

16. A non-transitory computer-readable medium having instructions stored thereon, wherein the instructions, when executed by a processor, cause the processor to:

acquire an image of a scene by means of a portable device, the scene including a real object, the real object forming at least a part of a device of a transmission and/or distribution network;

receive, at the portable device, a signal from a short-range wireless transmitter arranged at a predetermined position relative to the real object;

determine, based at least partially on directional information associated with the received signal, a location and orientation of the portable device relative to the short-range wireless transmitter;

retrieve an identity and/or characteristic of the real object from the received signal;

display, on the portable device, the acquired image and the virtual object; and position, in the acquired image, the virtual object based at least partially on the determined location and orientation of the portable device relative to the short-range wireless transmitter and on the predetermined position of the short-range wireless transmitter relative to the real object, wherein the virtual object is a graphic feature associated with the identity and/or characteristic of the real object retrieved from the received signal.

\* \* \* \* \*